United States Patent [19]
Sasaki et al.

[11] Patent Number: 5,161,872
[45] Date of Patent: Nov. 10, 1992

[54] INDICATOR NEEDLE OF AUTOMOTIVE INSTRUMENT AND METHOD OF MANUFACTURING THE SAME

[75] Inventors: Takami Sasaki, Kariya; Hirofumi Imaizumi, Anjo, both of Japan; Satoshi Yamada, Francavilla Livonia, Mich.; Masahiro Yasutake, Kanagawa; Susumu Takeda, Hadano, both of Japan

[73] Assignees: Nippondenso Co., Ltd., Kariya; Toyota Jidosha Kabushiki Kaisha, Toyota; Stanley Electric Co., Ltd., Tokyo, all of Japan

[21] Appl. No.: 800,354

[22] Filed: Dec. 2, 1991

[30] Foreign Application Priority Data

Nov. 30, 1990 [JP] Japan ................................ 2-341017

[51] Int. Cl.[5] ............................................ G01D 11/28
[52] U.S. Cl. ...................................... 362/29; 362/800
[58] Field of Search ............................ 362/23, 29, 800

[56] References Cited

U.S. PATENT DOCUMENTS

| | | | |
|---|---|---|---|
| 2,792,803 | 5/1927 | Hardesty | 362/29 X |
| 2,902,970 | 9/1959 | Kadlec | 362/29 X |
| 4,163,428 | 8/1979 | Ishikawa | 362/29 X |
| 4,959,759 | 9/1990 | Kohler | 362/29 X |

Primary Examiner—Allen M. Ostrager
Attorney, Agent, or Firm—Cushman, Darby & Cushman

[57] ABSTRACT

An indicator needle is provided with a base having a groove having a U-shaped cross section, which groove has an opening in an upper surface thereof and extends in a longitudinal direction of the indicator, and a light transmitting lens which plugs the opening of the upper surface of the base. A plurality of light emitting diodes are arranged in the groove of the base. Base ribs each having a triangular cross section and formed integrally with the base so as to cross the groove of the base are provided in the groove of the base, as well. Light generated from the light emitting diodes directly illuminates the lens, or is reflected by the base ribs to illuminates the same.

6 Claims, 4 Drawing Sheets

INDICATOR NEEDLE OF AUTOMOTIVE INSTRUMENT AND METHOD OF MANUFACTURING THE SAME

BACKGROUND OF THE INVENTION

The present invention relates to an indicator needle of an automotive instrument.

There has been a LED indicator needle of a type in which LED (light emitting diode) chips are embedded into the indicator needle, as an indicator needle of an automotive instrument. This LED indicator needle has such a disadvantage that there is no way to increase its light emitting luminance except for increasing the number of the LED chips so that the luminance of the LED chips is ineffectively used. Further, the LED indicator needle has another disadvantage that it has a smaller strength than a general indicator needle, since a coagulating material is used as a protective layer for protecting the chips.

SUMMARY OF THE INVENTION

An object of the present invention is to provide an indicator needle structure of an automotive instrument having a superior strength, in which luminance of a small number of LEDs is sufficiently used.

To solve the above problems, an indicator needle of an automotive instrument according to the present invention has a structure comprising a base having a groove with an opening in an upper surface thereof extending in a longitudinal direction of the indicator; a plurality of light emitting diodes arranged on a bottom of the groove and illuminating by receiving supply of electric power; base ribs arranged so as to cross the groove between said arbitrary light emitting diodes neighboring with each other for functioning to reinforce the base, besides reflecting light from the light emitting diodes towards an opening side of the groove; and a lens comprising a light emitting member to plug the opening of the groove, besides forming an illuminating surface of the indicator.

The light radiated from the LEDs strikes to the base ribs and is reflected by the same since the base ribs are reflecting members for the light, thus luminance of the LEDs is sufficiently used. At the same time, strength of the indicator is sufficiently great because a substrate and the base are integrally formed.

DETAILED DESCRIPTION OF THE PREFERRED EMBODIMENT

Figure 1:
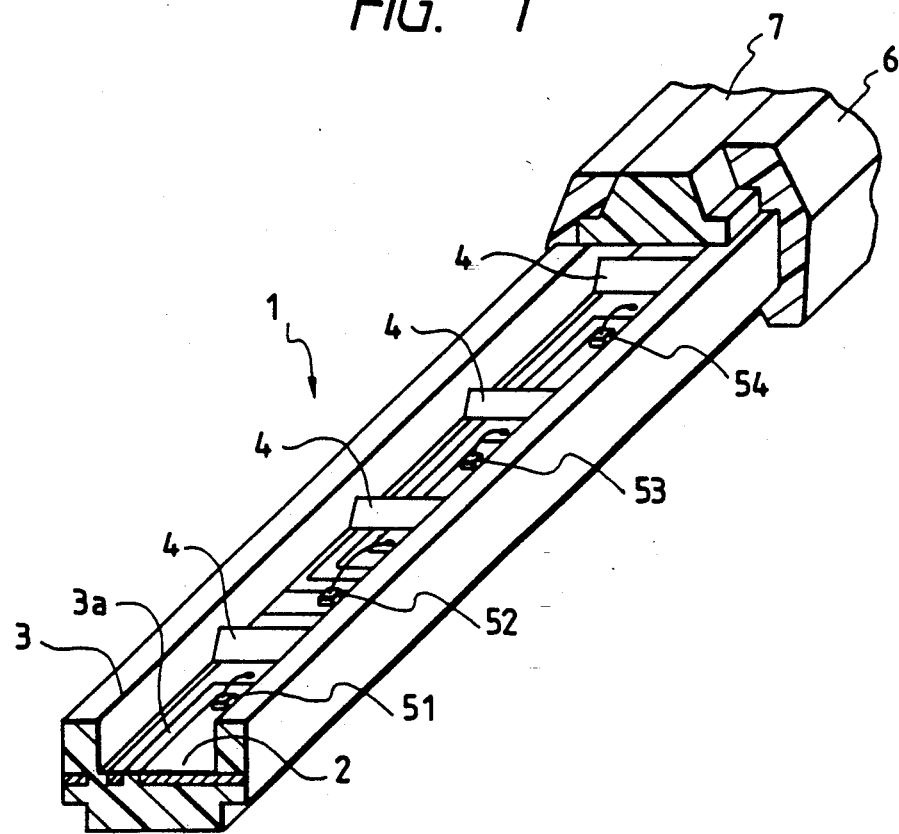
FIG. 1 is a perspective view, with portions broken away, showing an essential part of an indicator needle according to the present invention.
Figure 3:
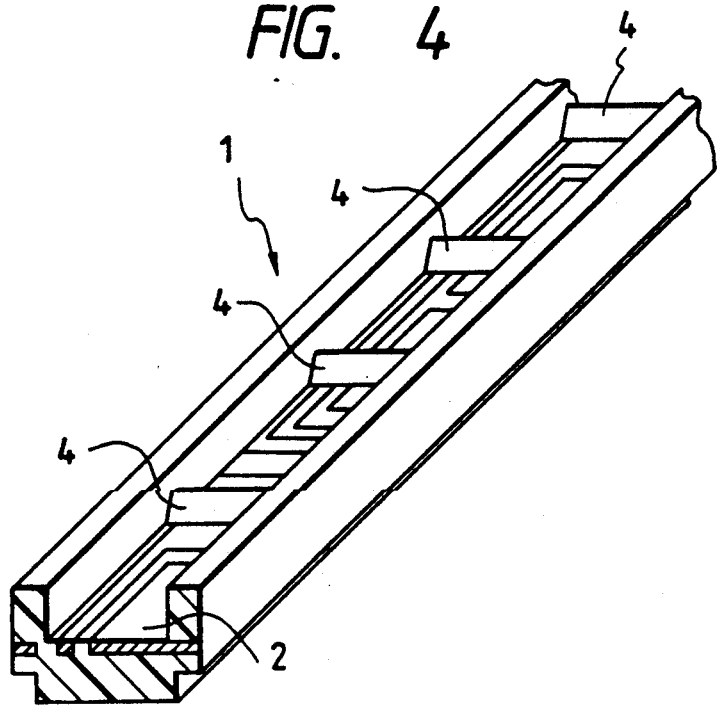
FIG. 3 is a perspective view showing a LED substrate used in the indicator needle above-mentioned.

Hereinafter, an example which has been embodied the present invention will be described, referring to the drawings. FIG. 1 shows an essential part of an indicator needle. A lead frame 2 is a phosphore bronze plate member of 0.2 mm in thickness, formed into a shape shown in FIG. 3. The upper surface of the lead frame 2 is silver(Ag)-plated on its entire surface, while the lower surface thereof is tinned (Sn) on its entire surface. In FIG. 3, LED chips 51 to 54 are bonded onto portions 201 to 204 indicated by broken lines on the upper surface of the lead frame 2. This lead frame 2 is a bonding body for the LED chips, also having a function as wires. In other words, this lead frame 2 comprises a first wire part 21 connected to a positive (+) terminal, a second wire part 22 connected to a negative (−) terminal, and a third wire part 23 for connecting the LED chips in series. The LED chips 51 to 54 are bonded onto the portions 201 to 204 indicated by the broken lines, respectively, as shown in FIG. 3. Between the first wire portion 21 of the lead frame 2 and the second wire portion 22 of the same, the three LED chips 52, 53 and 54 are connected in series via the third wire part. In this manner, a circuit in which several sets of LED chips are connected in parallel is formed as the whole indicator needle.

Figure 4:
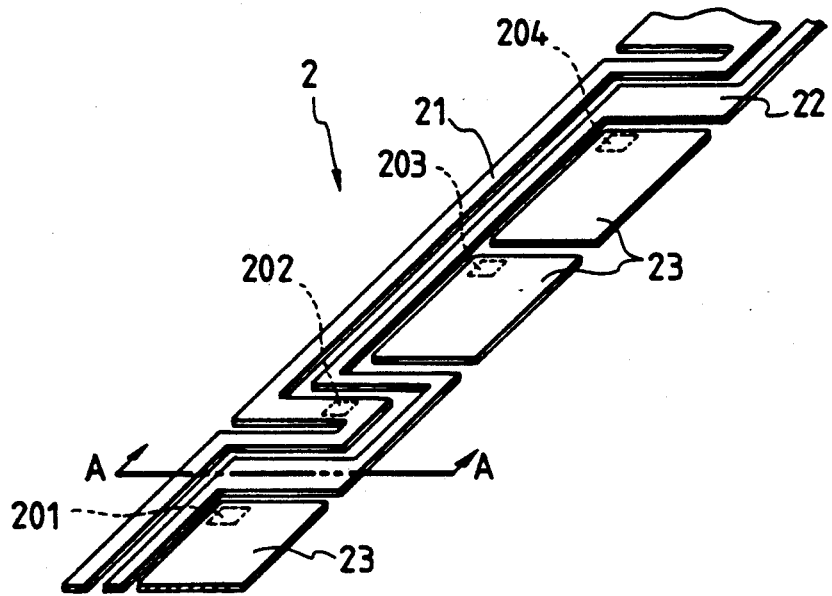
FIG. 4 is a perspective view showing a base seen in FIG. 3., inserted the LED substrate and formed.
Figure 5:
FIG. 5 is a sectional view, taken along line A—A in FIG. 3.

A base 3 has an accommodating part for a LED chip formed in a longitudinally extending groove having a U-shaped cross section and an upper opening. The base 3 is made from polycarbonate resin (white colored), and is inserted the lead frame 2 to be formed so that the lead frame 2 is arranged on the bottom 3a of the LED chip accommodating part (refer to FIG. 4). Base ribs 4 each having a triangular cross section are arranged in the LED chip accommodating part, and formed integrally with the base 3. These base ribs 4 have a function to reinforce the base 3.

Figure 2:
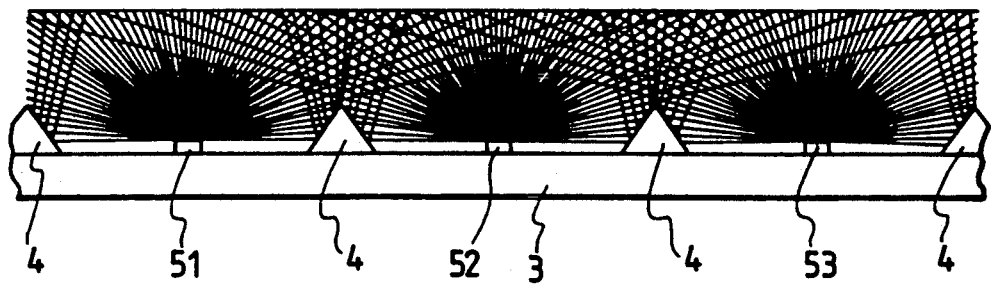
FIG. 2 is a view showing courses of light generated from LED chips.

FIG. 2 shows courses of light generated from the LED chips 51 to 53. As shown in FIG. 2, the base ribs 4 also have another function as reflecting plates which lead the light in upward directions as seen in the drawing. That is, the base ribs 4 each has preferably such a shape that the light from the LED chips is effectively led in the upward directions indicated in the drawing (to an illuminating surface of the indicator 1) so as to make the indicator be illuminated uniformly and high-luminously on the illuminating surface thereof. Consequently, it is preferable that the base rib 4 is designed to have a different shape depending on a pitch of the LED chips, a shape of the indicator 1, etc., for example, it may take a shape of which reflecting surface is curved into a quadratic curve.

Silicon resin 8 (refer to FIG. 7) is a protective member which is filled in the LED chip accommodating part of the base 3. Lens 7 made from polycarbonate resin (milky-white colored) is arranged so as to plug up the opening of the LED chip accommodating part of the base 3. This lens 7 has a function to receive the light incident from the LED chips 51 to 54, then to diffuse it so as to form the illuminating surface described above.

In the similar manner, a casing 6 made from polycarbonate resin (black colored) houses the lens 7 and the base 3. And, the casing 6 is provided with an opening so that the driver may visually recognize the lens 7 (the illuminating surface).

Steps for manufacturing the indicator needle 1 having the structure above-mentioned will be described on the bases of sectional views (FIGS. 5 to 8) showing a cross section thereof at A—A portion in each steps.

Figure 6:
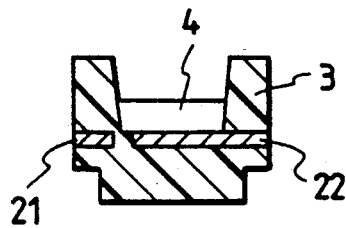
FIGS. 6 to 8 are sectional views showing a cross section of the above-mentioned indicator needle in the same position as shown in FIG. 5, in each steps for manufacturing the indicator needle.
Figure 7:
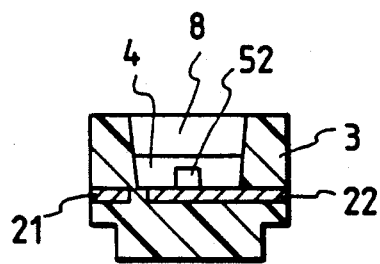
Figure 8:
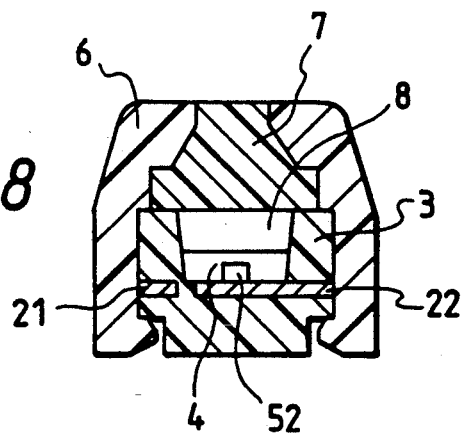

To begin with, the lead frame 2 is insertedly formed in the base 3. The base rib 4 is simultaneously formed integrally with the base 3 at this time (FIG. 6). The LED chip 52 is then bonded in a predetermined position on the upper surface of the lead frame 2, and the protective member 8 is filled thereonto (FIG. 7). Next, the base 3 is fixedly accommodated in the casing 6 in which the lens 7 is secured in a predetermined position.

Figure 9:
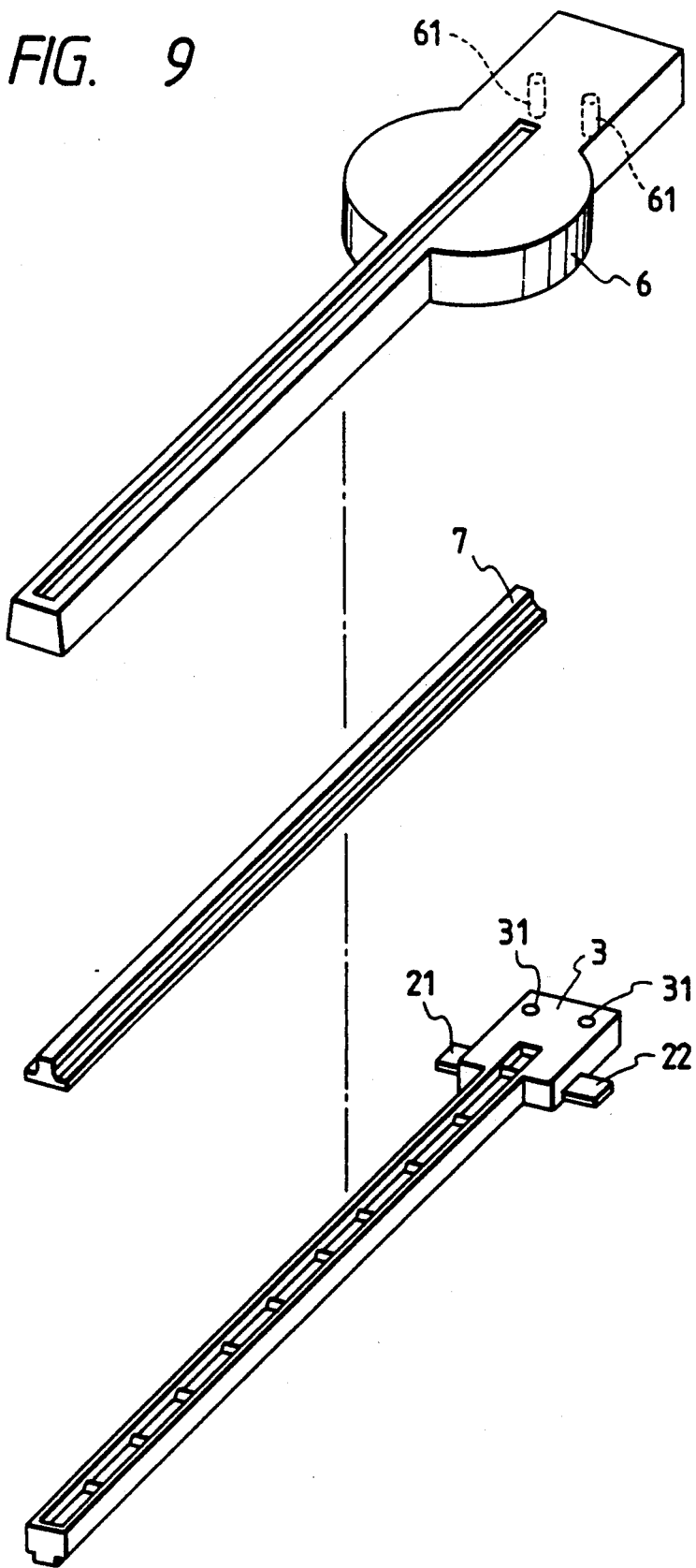
FIG. 9 is an exploded perspective view showing the whole structure of the indicator needle above-mentioned.

FIG. 9 is a view showing an entire structure of the indicator 1. Fixation of the base 3 and the casing 6 both described above will be achieved in such a manner that projections 61 of the casing 6 are respectively penetrated through holes 31 in the base 3, then tips of the projections 61 are heat-caulked.

In the above structure, the light radiated from the LED chips 5 is uniformly reflected by the base rib 4 to be emitted out of the indicator needle 1 passing through the lens 7. In this occasion, the base ribs 4 arranged between the LED chips collect the light from the LED chips to cause the illuminating surface of the lens 7 to illuminate highluminously and uniformly.

As having the above structure, the present invention provides superior effects as follows.

(1) It is possible to obtain uniform illumination as an indicator needle since the light from the LED chips is reflected by the base ribs so that the luminance of the LED chips may be maintained.

(2) Arrangement of the base ribs may increase the strength of the base, and further improve the durability of the indicator needle.

What is claimed is:

1. An indicator needle of an automotive instrument comprising:
   a base having a groove with an opening in an upper surface thereof extending in a longitudinal direction of the indicator;
   a plurality of light emitting diodes arranged on a bottom of the groove and illuminating by receiving supply of electric power;
   base ribs arranged so as to cross the groove between said arbitrary light emitting diodes neighboring with each other for functioning to reinforce the base, besides reflecting light from the light emitting diodes towards an opening side of the groove; and
   a lens comprising a light emitting member to plug the opening of the groove, besides forming an illuminating surface of the indicator.

2. An indicator needle of an automotive instrument according to claim 1, wherein each of the base ribs has a triangular cross section.

3. An indicator needle of an automotive instrument according to claim 1, wherein each of the base ribs has a cross sectional outline defined by a quadratic curve.

4. An indicator needle of an automotive instrument according to claim 1, wherein the light emitting diodes are arranged on a substrate for electrical power supply which is integrally fixed on the bottom of the groove.

5. An indicator needle of an automotive instrument according to claim 1, wherein each of the base ribs is arranged in a respective position lying between the light emitting diodes neighboring with each other.

6. A method for manufacturing an indicator needle of an automotive instrument comprising:
   a first step of forming a resin base, which has a groove with an opening in an upper surface thereof extending in a longitudinal direction of the indicator and base ribs arranged in predetermined respective positions in the groove so as to cross the groove, integrally with the lead frame so that the conductive lead frame is arranged on a bottom of the groove;
   a second step of arranging light emitting diodes between the base ribs, respectively, and on the lead frame to electrically connect the light emitting diodes to the lead frame; and
   a third step of plugging the opening of the groove with a lens comprising a light transmitting member to form an illuminating surface of the indicator.

* * * * *